Patented Aug. 22, 1950

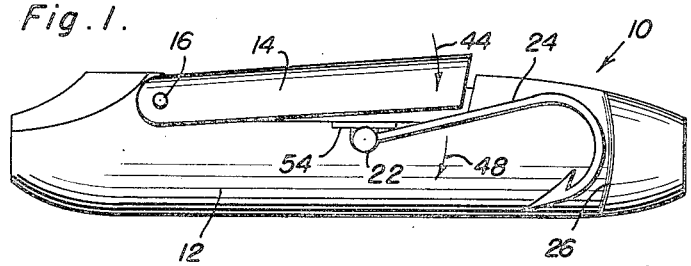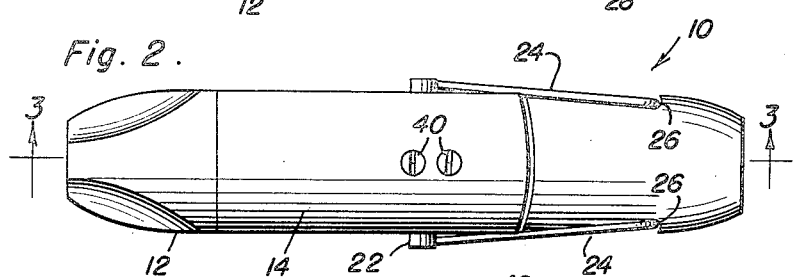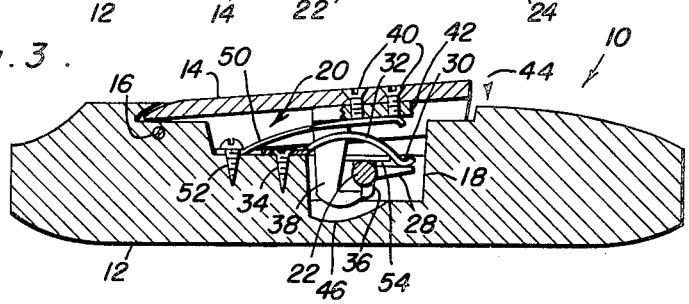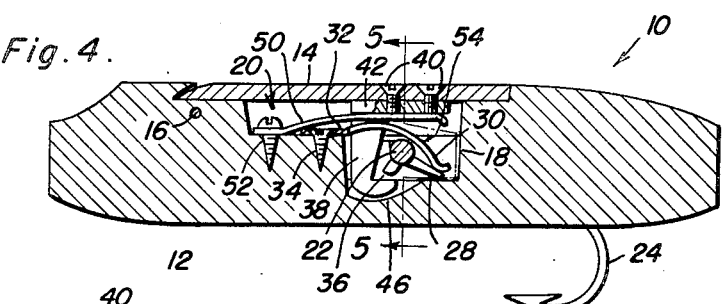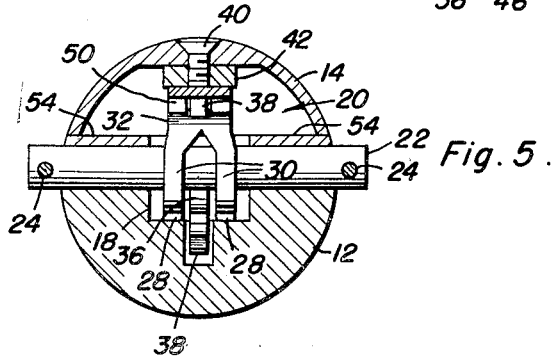

2,520,065

UNITED STATES PATENT OFFICE 2,520,065

FISH BAIT

Jay B. Rudy, New Philadelphia, Ohio

Application August 30, 1948, Serial No. 46,765

2 Claims. (Cl. 43—35)

This invention relates to new and useful improvements and structural refinements in fish baits, and the principal object of the invention is to prevent the hook or hooks of the bait from catching on weeds and similar submerged obstacles.

This object is achieved by the provision of a fish bait wherein the hooks are swingable from a retracted to a projected operative position, matters being so arranged that the hooks are retracted while the bait is being drawn through water, but become automatically projected as soon as a fish attempts to swallow the bait.

An important feature of the invention, therefore, resides in the provision of means for automatically projecting the fish hooks into a "catching" engagement with the mouth of the fish as soon as the fish closes its mouth in attempting to swallow the bait.

An additional feature of the invention resides in the provision of means for releasably retaining the fish hooks in their retracted position, so that they do not become entangled with weeds and the like.

An important advantage of the invention resides in its life-like appearance, since the retracted fish hooks are disposed adjacent the sides of the bait and being unobtrusive, do not lend an impression of artificiality to the bait as a whole.

Other advantages of the invention reside in its simplicity of construction and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 1 is a side elevational view of the invention with the fish hooks thereof in their retracted position;

Figure 2 is a top plan view of the subject shown in Figure 1;

Figure 3 is a cross sectional view, taken substantially in the plane of the line 3—3 in Figure 2;

Figure 4 is a cross sectional view similar to that shown in Figure 3, but illustrating the fish hooks in their projected positions; and Figure 5 is a cross sectional view, taken substantially in the plane of the line 5—5 in Figure 4.

Like characters of reference are employed to designate like parts in the specification and throughout the several views.

Referring now to the accompanying drawings in detail, the invention consists of a fish bait, designated generally by the reference character 10, the same embodying in its construction the main body portion 12 and what may be referred to as a companion body portion 14 which is depressibly mounted on the body portion 12 by being pivotally connected thereto as at 16.

The body portion 12 is provided with a chamber or cavity 18 and the body portion 14 is convexoconcave so as to provide a further chamber or cavity 20 in communication with the cavity 18, as is best shown in Figure 5. A shaft 22 extends transversely through the cavity 18 and is rotatably journaled in the side portions of the main body portion 12, the end portions of the shaft 22 projecting laterally from the main body portion 12 and being formed with apertures in which are secured suitable fish hooks 24. These fish hooks are swingable from retracted positions shown in Figures 1 and 2 to projected, operative positions shown in Figure 4, and the sides of the body portion 12 are relieved, as at 26, to accommodate the fish hooks in their retracted positions, substantially as shown.

An intermediate portion of the shaft 22 is provided with a pair of spaced, radially projecting fingers 28 which are disposed in the cavity 18 and are engaged by forked end portions 30 of a leaf spring 32 which is secured to the main body portion 12, as at 34.

By virtue of this arrangement the hooks 24 are urged from their retracted positions shown in Figures 1 and 2 to their projected, operative positions, as illustrated in Figure 4. However, means are also provided for releasably retaining the fish hooks 24 in their retracted positions, these means including a radially extending detent 36 provided on the shaft 22 between the aforementioned fingers 30, this detent normally abutting the lower end portion of a hook shaped stop 38 secured to the depressible body portion 14, as at 40.

In effect, the upper end portion of the stop 38 is formed integrally with a lateral projection 42 which the securing means 40 engage, the stop 38 extending downwardly into the cavity 18 and engaging the detent 36 when the hooks 24 are retracted, as has already been explained.

However, by simply depressing the body portion 14 in the direction of the arrow 44, the lower end portion of the stop 38 is shifted into a depression 46 with which the cavity 18 is provided, thereby disengaging the stop from the detent 36 and permitting the shaft 22 to rotate under the action of the spring 32 as shown at 48 in Figure 1, so as to lower the hooks 24 from their retracted to their projected, operative positions, as shown.

It will be apparent from the foregoing that when the invention is placed in use and is "preset" with the hooks 24 in their retracted positions, the lure may be drawn through water without the fish hooks becoming entangled with weeds since the fish hooks will be virtually unobtrusive. However, when a fish endeavors to swallow the bait, the body portion 14 will be depressed, as shown at 44, and the hooks 24 will be projected into "catching" engagement with the mouth of the fish, thereby catching the same.

The body portion 14 is normally urged to its undepressed position by means of a leaf spring 50, one end portion of which is secured, as at 52, to the body portion 12 while its remaining end portion bears against the under surface of the projection 42 of the stop 38, as is best shown in Figures 3 and 4.

It should be also explained that a pair of bearing plates 54 are suitably secured to the body portion 12 in order to retain the rotatable shaft 22 in position, removal of these bearing plates (after removal of the body portion 14) facilitating removal of the shaft 22 together with the fingers 28 and the detent 36, for purposes of adjustment, servicing or replacement, as the case may be.

It is believed that the advantages and features of the invention will be clearly apparent from the foregoing disclosure, and accordingly, further description thereof at this point is deemed unnecessary.

Having described the invention, what is claimed as new is:

1. A fish bait comprising a main body portion and depressible companion body portion pivotally connected thereto, a rotatable shaft extending transversely through said main body portion, a pair of fish hooks secured to the ends of said shaft and adapted for swinging from retracted positions adjacent the sides of said main body portion to projected operative positions, means including a resilient member for projecting said hooks, a radially extending detent on said shaft, and a hook-shaped stop secured to said companion body portion and extending into said main body portion, said stop being releasably engageable by said detent to retain said hooks in their retracted positions against the action of said resilient member.

2. The device as defined in claim 1 wherein said resilient member comprises a leaf spring secured at one end to said main body portion, together with a radially projecting finger on said shaft, the remaining end of said spring bearing against said finger.

JAY B. RUDY.

REFERENCES CITED

The following references are of record in the file of this patent:

UNITED STATES PATENTS

| Number | Name | Date |
| --- | --- | --- |
| 1,318,073 | Gottschalk | Oct. 7, 1919 |
| 1,639,766 | Fisher | Aug. 23, 1927 |
| 2,134,841 | Reese | Nov. 1, 1938 |
| 2,200,670 | Hargrett | May 14, 1940 |